United States Patent [19]

Minnich

[11] 4,439,716
[45] Mar. 27, 1984

[54] COMPENSATION APPARATUS FOR AN ELECTROHYDRAULIC SERVOVALVE

[75] Inventor: George E. Minnich, Vestal, N.Y.

[73] Assignee: The Singer Company, Binghamton, N.Y.

[21] Appl. No.: 328,059

[22] Filed: Dec. 7, 1981

[51] Int. Cl.³ .......................................... G05D 23/275
[52] U.S. Cl. .................................... 318/632; 318/561; 318/615
[58] Field of Search ............... 318/561, 611, 632, 615, 318/616, 617

[56] References Cited

U.S. PATENT DOCUMENTS

| | | | |
|---|---|---|---|
| 3,051,883 | 8/1962 | Smith | 318/611 |
| 4,016,469 | 4/1977 | Lanni et al. | 318/689 X |
| 4,051,423 | 9/1977 | Touchton et al. | 318/611 |
| 4,059,790 | 11/1977 | Kennel | 318/689 |
| 4,096,426 | 6/1978 | Tremaine et al. | 318/611 |
| 4,139,811 | 2/1979 | Klinger | 318/611 X |

*Primary Examiner*—B. Dobeck
*Attorney, Agent, or Firm*—Douglas M. Clarkson; Jeff Rothenberg

[57] ABSTRACT

Electronic compensation apparatus for a drive system associated with a torque motor of an electrohydraulic servovalve. The apparatus includes means to define an open loop transfer function characteristic of the drive system, wherein the transfer function corresponds to a notch filter. Further included are means to provide the open loop characteristic with a closure rate of approximately no more than 6 db/octave with respect to a function $1/\beta = 1 - G_{cl}(s)$, where $G_{cl}(s)$ corresponds to a closed loop transfer function of the drive system. In particular, the notch filter may be realized in a drive system that includes a series resistive-capacitive circuit connected in parallel with the torque motor. The 6 db/octave closure rate is provided by a variation of the impedance of the series resistive-capacitive circuit.

4 Claims, 9 Drawing Figures

COMPENSATION APPARATUS FOR AN ELECTROHYDRAULIC SERVOVALVE

TECHNICAL FIELD

The present invention relates to electrohydraulic servovalves and more particularly relates to electronic compensation apparatus for a drive system associated with an electrohydraulic servovalve.

BACKGROUND ART

The operation of the electrohydraulic servovalve, of the type for which the present invention is particularly useful, is set forth in detail in U.S. patent application, Ser. No. 328,058 entitled Electronic Compensator For An Electrohydraulic Servovalve, by Applegate et al., filed on Dec. 7, 1981, and assigned to the same assignee as the present invention. This Applegate disclosure is incorporated by reference herein for a thorough exposition of the operation of an electrohydraulic servovalve.

In brief, the operation of an electrohydraulic servovalve includes the employment of a drive system which functions to supply a constant drive signal $I_c(s)$ to the armature of a torque motor of the electrohydraulic servovalve. It is desired that the drive signal $I_c(s)$ developed by the drive system be proportional to an input control signal $E_c(s)$ which is inputted to the drive system. In this manner, the torque developed by the torque motor is proportional to the input control signal, and the operation of the electrohydraulic servovalve is thereby controlled.

In a typical construction of a drive system, it is implicitly assumed that the operation of an electrohydraulic servovalve is independent of the range of input frequencies of the drive signal $I_c(s)$ and therefore may be modeled as a resistive device. Based on this assumption, the drive system is designed so that its associated transfer function $G(s)$ which is defined as $$G(s) = \frac{I_c(s)}{E_c(s)},$$

is a constant, and therefore independent of frequency.

In a typical employment of an electrohydraulic servovalve, the range of input frequencies of the drive signal $I_c(s)$ is relatively small. For this case, the electrohydraulic servovalve performs in a satisfactory manner, even though it is modeled as a purely resistive device and the drive system transfer function is a constant. When high input frequencies are inputted, however, to an electrohydraulic servovalve that is modeled as a resistive device, it exhibits gross instabilities and tends to be quite sensitive to component tolerances.

For a state-of-the-art employment of an electrohydraulic servovalve, for example in the field of flight simulation, it is important that an electrohydraulic servovalve be capable of satisfactorily handling a relatively broad band of input drive signal frequencies. However, electrohydraulic servovalves that are now commercially available are based on the resistive model, and therefore exhibit the indicated instabilities when high frequencies are inputted to the electrohydraulic servovalve. Consequently, commercially available electrohydraulic servovalves do not adequately fulfill state of the art requirements.

The present invention provides an electrohydraulic servovalve with associated electronic compensation apparatus that addresses the cited difficulties and fulfills the state-of-the-art requirements. In particular, the present inventor has developed an improved model for an electrohydraulic servovalve and incorporates the benefits of this improved model in novel compensation apparatus associated with the drive system, so that an electrohydraulic servovalve can satisfactorily accept a broad band of input frequencies.

The present invention is particularly suitable for employment with relatively large, two-stage electrohydraulic servovalves that are driven by input drive signals having a broad band of frequencies (e.g., 0–10,000 hz). The associated compensation apparatus ensures that the torque developed by the torque motor is proportional to the input control signal for the broad band of drive signal frequencies.

DISCLOSURE OF THE INVENTION

Accordingly it is an object of the present invention to provide compensation apparatus for an electrohydraulic servovalve which significantly expands the bandwidth of the system response.

Another object of the present invention is to enhance the stability of an electrohydraulic servovalve when driven by a relatively broad band of input drive signal frequencies.

In accordance with the present invention, compensation apparatus is provided that is associated with a drive system for a torque motor of an electrohydraulic servovalve. The compensation apparatus includes means to define an open loop transfer function characteristic of the drive system, wherein the transfer function corresponds to a notch filter. Further included are means to provide the characteristic with a closure rate of approximately no more than 6 db/octave with respect to a function $1/\beta = 1 - G_{cl}(s)$, where $G_{cl}(s)$ corresponds to a closed loop transfer function of the drive system.

BRIEF DESCRIPTION OF THE DRAWINGS

These and other features of the present invention will be more clearly understood from a consideration of the following description taken in connection with the accompanying drawings in which.

BEST MODE FOR CARRYING OUT THE INVENTION

Figure 1:
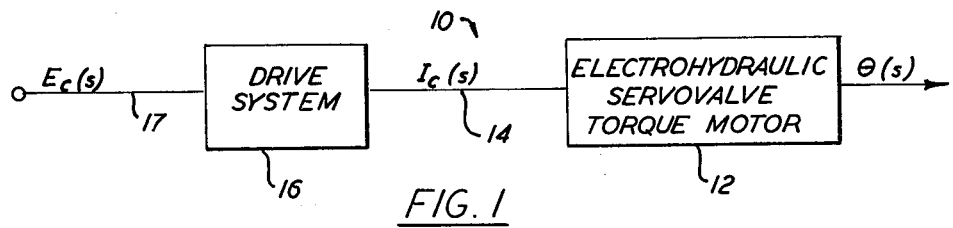
FIG. 1 is a block diagram of an electrohydraulic servovalve torque motor without the compensation apparatus of the present invention.

Reference is now made to FIG. 1 which shows a block diagram 10 of an electrohydraulic servovalve torque motor 12 without the electronic compensation apparatus of the present invention. As shown in FIG. 1, the torque motor 12 is driven by an electrical drive signal 14 that is identified by a Laplacian function* $I_c(s)$. The drive signal 14 is produced by a drive system 16, which, in turn, is dependent upon an input control signal 17, further identified as the Laplacian function $E_c(s)$.

*The Laplacian function is defined in a conventional manner by the complex operator $s=j\omega$, where $\omega=2\pi f$ is frequency in radians/second and $j=\sqrt{-1}$.

In operation, the armature of the torque motor rotates in response to the drive signal $I_c(s)$. The angular position $\theta(s)$ of the armature is ideally related to the drive signal by the linear equation (1) $\theta(s)=k_t I_c(s)$, where $k_t$ is a torque constant of the motor.

Figure 2:
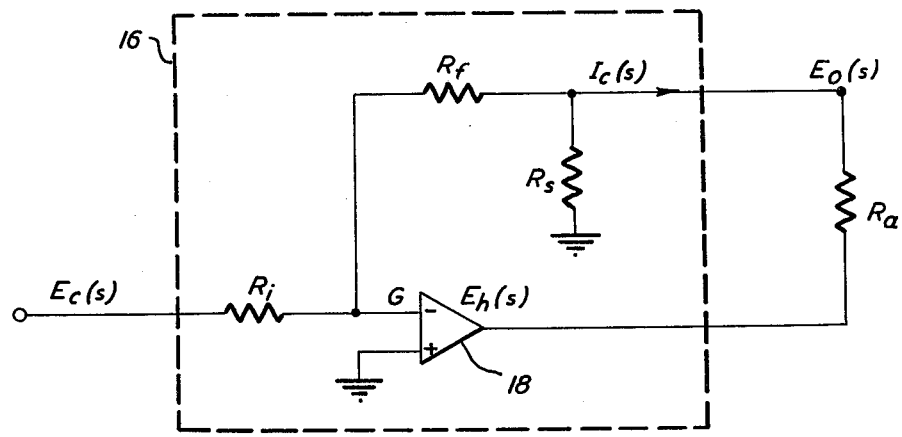
FIG. 2 shows electronic hardware that corresponds to the block diagram of FIG. 1.

FIG. 2 corresponds to FIG. 1 and shows electronic hardware that may be used to realize the open loop feedback control system of FIG. 1. The hardware realizes a first model that is used to represent the drive system and a second model that is used to represent the armature of the torque motor. In summary, the first model for the drive system is characterized by the fact that the drive system has an associated transfer function G which is independent of frequency. The second model for the armature is characterized by the fact that it represents the impedance of the armature as a resistive device.

In particular, the first model for the drive system 16 includes a conventional operational amplifier 18 connected in a circuit with an input resistor $R_i$, a feedback resistor $R_f$, and a sampling resistor $R_s$. A closed loop transfer or gain function $G_{cl}$ of the drive system 16 is expressed by the following equation:

$$\frac{I_c(s)}{E_c(s)} = G_{cL} = -\frac{R_f}{R_i R_s}$$ (2)

The drive system 16, as modeled, functions to ensure that the electrical drive signal $I_c(s)$ is related to the input control signal by the following equation:

$$I_c(S) = G_{cl} E_c(S)$$

To this end, the amplifier 18 forces the output voltage $E_h(s)$ (where the subscript h refers to the voltage of the "high" side of the armature of the torque motor) to be whatever magnitude is required, in order to provide a constant $I_c(s)$ drive signal which is related to the input control signal by a linear equation (3) (i.e., $I_c(s) = G_{cl} E_c(s)$).

The operation of the electrohydraulic servovalve of FIGS. 1 and 2 includes providing the electrical drive signal $I_c(s)$ as an input to the armature of the torque motor which has an impedance $Z(s) = R_\mu$. It is observed that $I_c(s)$ is frequency dependent, in the general case, but $Z(s)$ is independent of frequency. When the input frequencies associated with $I_c(s)$ are relatively low, the electrohydraulic servovalve of FIGS. 1 and 2 operates substantially in accordance with the first and second models, and as a result, the demands of equation (1), $\theta(s) = k_t I_c(s)$, are satisfied.

When, however, the input frequencies of $I_c(s)$ extend over an appreciable range, for example 0–20,000 hz, it is observed that the electrohydraulic servovalve exhibits instabilities so that $\theta(s)$ is no longer linearly related to $I_c(s)$. Effectively, the bandwidth for stable operation of the electrohydraulic servovalve modeled in correspondence with FIGS. 1 and 2 is relatively narrow (i.e., typically less than 1000 hz).

Figure 3:
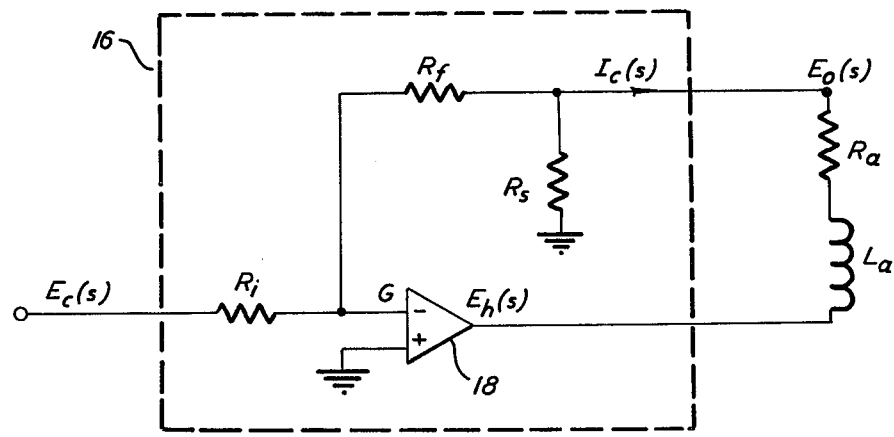
FIG. 3 shows electronic hardware that corresponds to an improved model of a torque motor.

The present inventor has determined that the instabilities in part derive from the inadequacies of the aforementioned first and second models for the drive system 16 and armature of the torque motor respectively. The inadequacies of the second model arise from the fact that at relatively high input frequencies of the drive signal $I_c(s)$, the armature has a significant inductive component $L_a s$ that is frequency dependent. The inventor therefore provides in FIG. 3 an improved second model 20 for the armature of the torque motor which, in a preferred embodiment, includes a frequency dependent inductive component $L_a s$ in series with a resistive component $R_a$.

Figure 4:
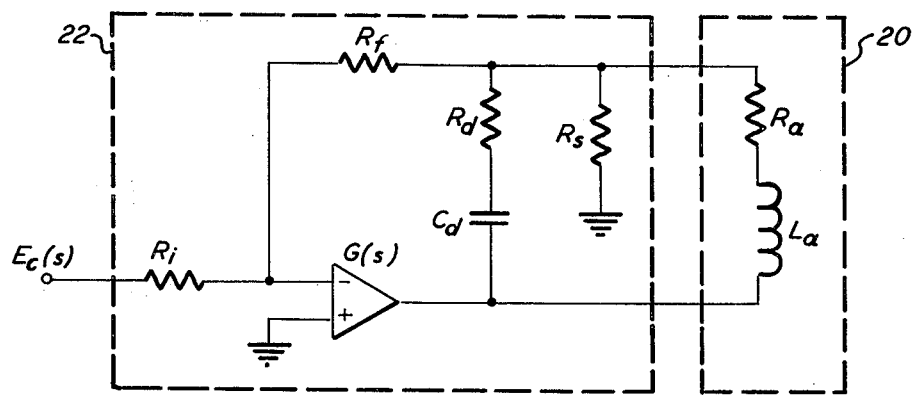
FIG. 4 shows electronic hardware that corresponds to an improved model for a drive system of an electrohydraulic servovalve.

The inadequacies of the first model include the fact that it does not recognize that the drive system is also dependent on frequency. This dependency in part derives from parasitic capacitances associated with the operational amplifier. The inventor therefore provides an improved first model 22 for the drive system 16, which is shown in FIG. 4. The improved first model includes the addition of a variable resistive component $R_d$ connected in series with a frequency dependent, variable capacitive component $C_d/s$. The cited additions result in an alteration of the transfer or gain function associated with the operational amplifier, so that it is now frequency dependent and of the form $$G(s) = \frac{G_o}{1 + Ts}$$ (4)

where, $G_o$ = open loop d.c. gain of the operational amplifier
$T$ = break frequency of the operational amplifier.

The compensation apparatus of the improved first model 22, namely the series $R_d$-$C_d$ circuit of the drive system, functions and co-acts with the circuit elements of the improved second model 20 for the armature, namely the series $R_a$-$L_a$ circuit. Since the drive system co-acts with the armature, a preferred embodiment of the present invention locates the compensation apparatus of the drive system so that it is in parallel with the armature of the torque motor, as shown in FIG. 4. This network arrangement simultaneously provides compensation for the drive system, so that is not frequency dependent, and also provides overall compensation for the drive system-armature combination, so that the combination operates as a resistive device (i.e., independent of frequency). The network connection of FIG. 4 is redrawn, without any substantive changes, in FIG. 5, in order to clearly show the co-action of the drive system-armature combination. In particular, the combined impedance function $Z_c(s)$ realizes the co-action of the combination, as it includes a component contributed by the drive electronics system (i.e., $R_d + C_d/s$), as well as a component contributed by the armature (i.e. $R_a + L_a s$).

Figure 6:
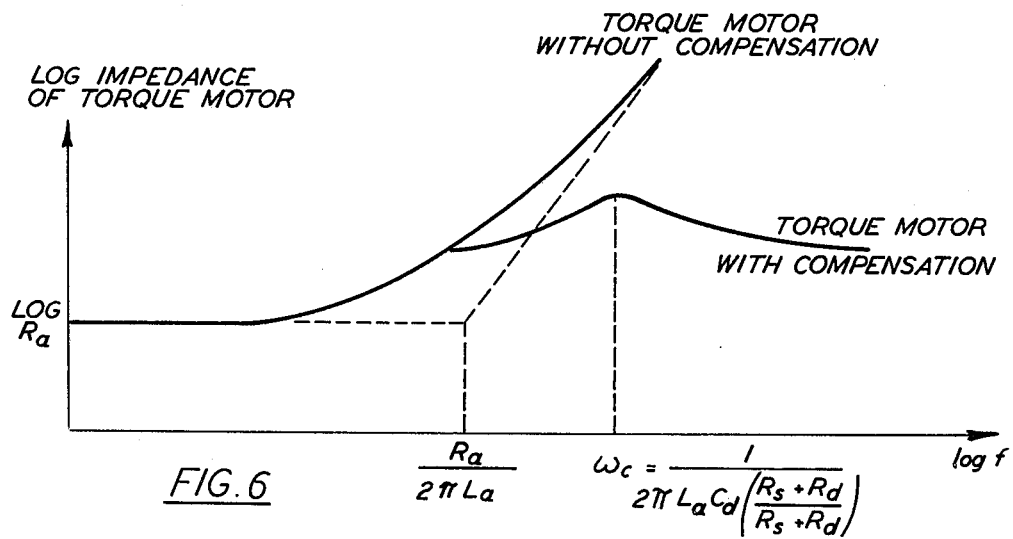
FIG. 6 is a graph of the impedance of the torque motor as a function of frequency.

The present invention therefore provides an improved first and second model for the drive system and armature of an electrohydraulic servovalve, and compensation apparatus to realize the improved models. An electrohydraulic servovalve that employs the compensation apparatus of the present invention operates in accordance with FIG. 6. For example, at relatively low values of the input frequency f of $I_c(s)$, the transfer function $G_{cf}(s)$ reduces to substantially the D.C. gain magnitude of $G_{cf}(s)$ defined by equation (2). Moreover, for these relatively low values of f, the impedance of the torque motor is proportional to $R_a$, which is the resistive value of the armature. Furthermore, at relatively high values of the input frequency f of $I_c(s)$, the drive system-armature combination operates in accordance with the improved first and second model so that the combination operates substantially independently of the input frequencies of $I_c(s)$.

Figure 5:
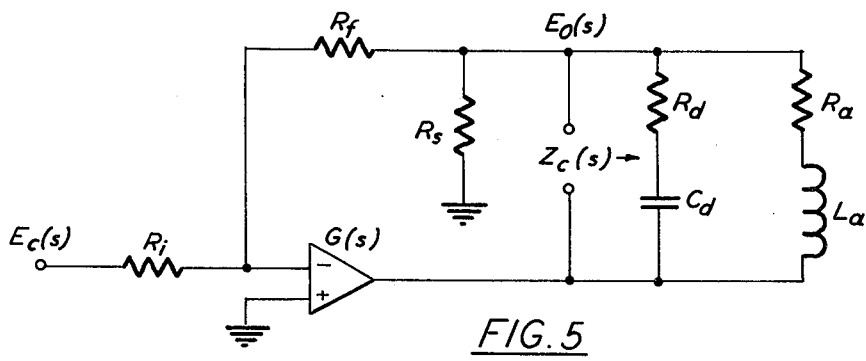
FIG. 5 shows the network connection of FIG. 4 redrawn, in order to make clear the coaction of the drive system-armature combination.

The fact that the drive system armature combination of FIG. 5 is frequency independent, indicates that the compensation apparatus of the present invention extends the bandwidth and enhances the stability of the electrohydraulic servovalve. A quantitative measure of the extended bandwidth is provided by first deriving the open loop and closed loop transfer functions associated with the feedback control diagram of FIG. 7, which corresponds to the circuit shown in FIG. 5.

Figure 7:
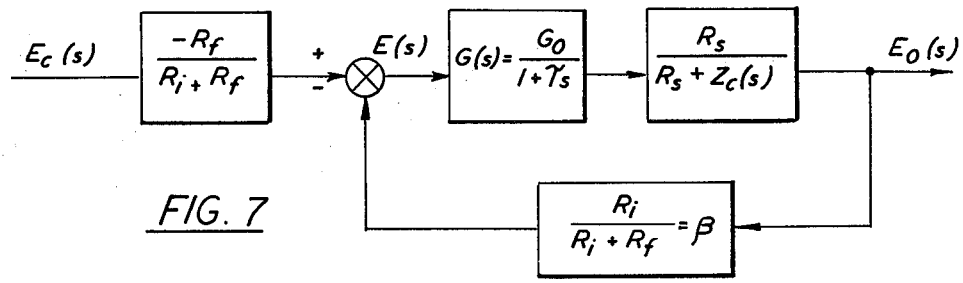
FIG. 7 provides a feedback control diagram that corresponds to the circuit shown in FIG. 5.

Accordingly, the open loop transfer function of FIG. 7 may be expressed by equation (5)

$$G_{oL}(s) = \frac{E_o(s)}{E(s)} = G(s)\left[\frac{R_s}{R_s + Z_c(s)}\right]$$

and the closed loop transfer function may be expressed by equation (6)

$$G_{cL}(s) = \frac{E_o(s)}{E_c(s)} = \frac{G(s)\left[\frac{R_s}{R_s + Z_c(s)}\right]\left(-\frac{R_f}{R_i + R_f}\right)}{1 + G(s)\left[\frac{R_s}{R_s + Z_c(s)}\right]}$$

Figure 8:
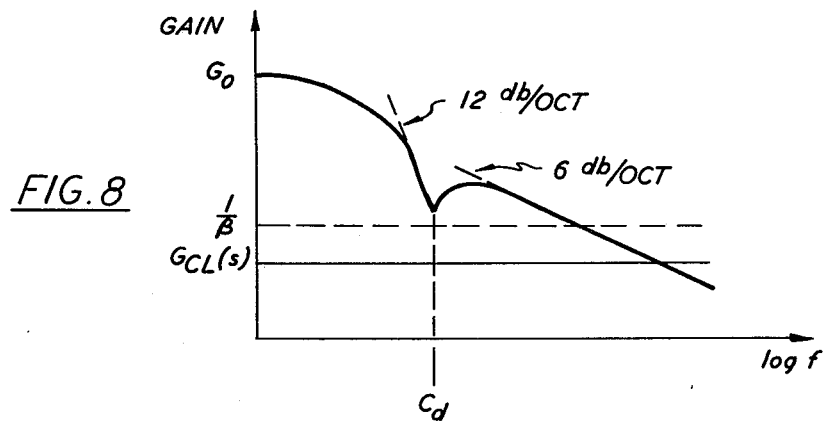
FIG. 8 provides graphs of the open loop and closed loop transfer functions developed from the feedback control diagram of FIG. 7.

The open and closed loop transfer functions expressed in equations (5) and (6) respectively are shown graphically in FIG. 8. Also shown in FIG. 8 is a plot of the function $1/\beta$ which is related to the closed loop transfer function of equation (6) by the expression $1/\beta = 1 - G_{cf}(s)$. It can be observed in FIG. 8 that for relatively low input frequencies f of $I_c(s)$, the open loop function remains at a fairly constant magnitude of $G_o$. As the frequency f increases, the magnitude of the open loop function starts to fall off. As is well-known in the art, the closure rate between the open loop characteristic and the $1/\beta$ characteristic should be no more than 6 db/octave, and should certainly be less than a 12 db/octave closure rate, since a 12 db/octave closure rate indicates an oscillatory or unstable loop.

The compensation apparatus of the present invention provides a means to ensure that the closure rate does not exceed 6 db/octave. This is accomplished in the following manner.

First, it is observed that the shape of the open loop transfer function, as shown in FIG. 8, corresponds to the shape of a notched filter. The intersection of the $1/\beta$ characteristic and the notch, moreover, corresponds to a closure rate greater than 12 db/octave. This invention provides compensation so that the $1/\beta$ characteristic intersects the open loop after a 6 db/octave rolloff is achieved. Controlling the depth and location of the notch acts to determine the closure rate. In turn, the depth of the notch may be controlled by varying the magnitude of the variable component $C_d$, since $C_d$ appears as a variable in the function $Z_c(s)$ in the open loop transfer function expressed in equation (5). There is one constraint imposed upon the extent of the variation of the magnitude of $C_d$, and that is, that a chosen value for $C_d$ should not force the open loop transfer function to cross the $1/\beta$ characteristic function (indicated by the dotted line in FIG. 8) in the vicinity of the notch.

The effectiveness of the compensation achieved by varying $C_d$, is shown by returning to FIG. 6. Here, it is observed that the center frequency $\omega_c$ is expressed as $$\omega_c = \frac{1}{2\pi L_a C_d \cdot \left(\frac{R_s + R_d}{R_s + R_a}\right)}$$

The center frequency $\omega_c$ corresponds to that frequency where there is the greatest deviation from the ideal model of the armature as a purely resistive device (i.e., Log $R_a$). The extent of the deviation from the ideal is controlled in part by varying $C_d$.

It may also be observed in equation (7) that the center frequency $\omega_c$ is dependent upon the variable component $R_d$. In a preferred embodiment of the present invention, it is determined that optimal compensation control may be secured by setting the drive system compensation resistance $R_d$ equal to the sampling resistance $R_s$, and, setting both $R_d$ and $R_s$ equal to the known armature resistance $R_a$ (i.e. $R_d = R_s = R_a$).

Figure 9:
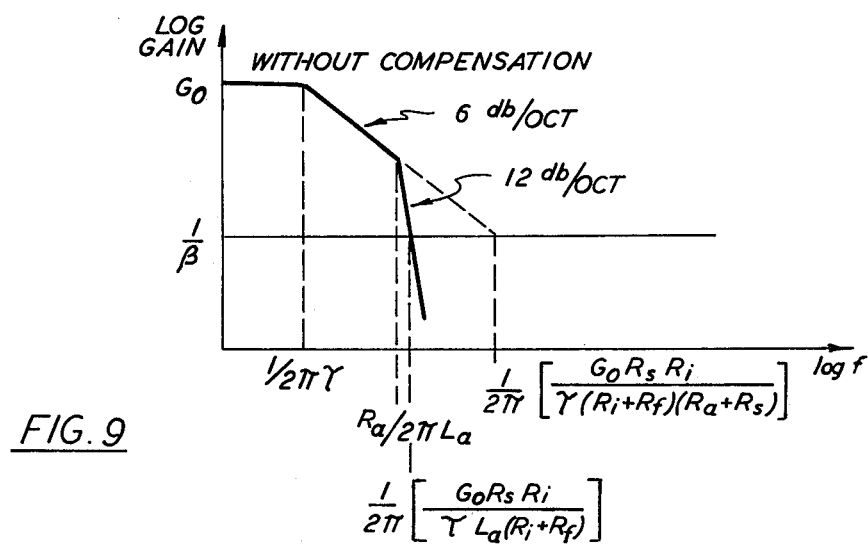
FIG. 9 illustrates the operation of an electrohydraulic servovalve with and without the compensation apparatus of the present invention.

The compensation apparatus of the present invention extends the bandwidth and enhances the stability of an electrohydraulic servovalve. FIG. 9 illustrates the fact that, without the compensation apparatus, the operational amplifier 18 has an unacceptable closure rate of 12 db/octave due to the 6 db/octave fall-off attributed to the amplifier itself, and due to 6 db/octave fall-off attributed to the armature. Moreover, without the compensation apparatus, the drive system oscillates at the frequency given by $$\frac{1}{2\pi}\left[\frac{G_o R_s R_i}{L_a(R_i + R_f)}\right]^{\frac{1}{2}}$$

However, with the compensation apparatus of the present invention, the closure rate does not exceed 6 db/octave and the bandwidth of the drive system is extended to a frequency given by $$\frac{1}{2\pi}\left[\frac{G_o R_s R_i}{(R_i + R_f)(R_a + R_s)}\right].$$

In summary, then, the compensation apparatus of the present invention extends the bandwidth and enhances the stability of an electrohydraulic servovalve, and secures these advantages by altering only the open loop transfer function characteristic, while leaving the closed loop characteristic unchanged. As a direct consequence of this compensation apparatus, the electohydraulic servovalve exhibits stability over an extended bandwidth, even when the closed loop gain is less than one.

The derivation of the transfer functions expressed in equations (5) and (6), is based on the circuit diagram of FIG. 5. Other circuit diagrams having the same transfer functions are conceivable. Well-known techniques exist in the control system and electronics art for the construction of circuits having desired system transfer functions. It is believed that the circuit diagram of FIG. 5 is an optimal implementation of such transfer functions and is therefore preferred. However, it is intended that all such circuits which have frequency domain transfer functions corresponding to those indicated above fall within the scope of the present invention.

The present invention, in summary, may be employed to improve the response characteristic of an electrohydraulic servovalve. Although specific embodiments of the present invention have been described herein, it will be obvious to those skilled in the art that various modifications may be made without departing from the spirit of the invention. For example, the compensation apparatus may be employed with any physical element whose defining parameters are in correspondence with those of a two-stage electrohydraulic servovalve. With the foregoing in mind, it is understood that the invention is intended to be limited solely by the appended claims.

I claim:

1. Compensation apparatus for a drive system associated with a torque motor of an electrohydraulic servovalve, comprising:
   (a) means to define an open loop transfer function characteristic of said drive system, wherein said transfer function corresponds to a notch filter; and
   (b) means to provide said characteristic with a closure rate of approximately no more than 6 db/octave with respect to a function $$1/\beta = 1 - G_{cl}(S)$$

where $G_{cl}(s)$ corresponds to a closed loop transfer function of said drive system.

2. The apparatus of claim 1, wherein said closure rate is controlled by the location and the depth of the notch defined by said notch filter, with respect to the function $1/\beta$.

3. The apparatus of claim 2, wherein said open loop transfer function characteristic of said drive system is defined by an equation $$G_{oL}(s) = G(s) \left[ \frac{Z(s)}{Z(s) + Z_c(s)} \right]$$

wherein
   (a) G(s) comprises a first multiplicative term that defines the frequency dependency of the impedance of said drive system; and $$\left[ \frac{Z(s)}{Z(s) + Z_c(s)} \right] \quad \text{(b)}$$

comprises a second multiplicative term that defines the frequency dependency of the impedance Z(s) of said torque motor and the frequency dependency $Z_c(s)$ of a combined impedance of a drive system-torque motor combination.

4. The apparatus of claim 3, wherein the location and depth of said notch is controlled in correspondence to changes in the value of the impedance $Z_c(s)$ of said drive system-torque motor combination.

* * * * *